Dec. 24, 1929.  N. K. ISAAK  1,741,058
WINDSHIELD HEATER
Filed June 4, 1928
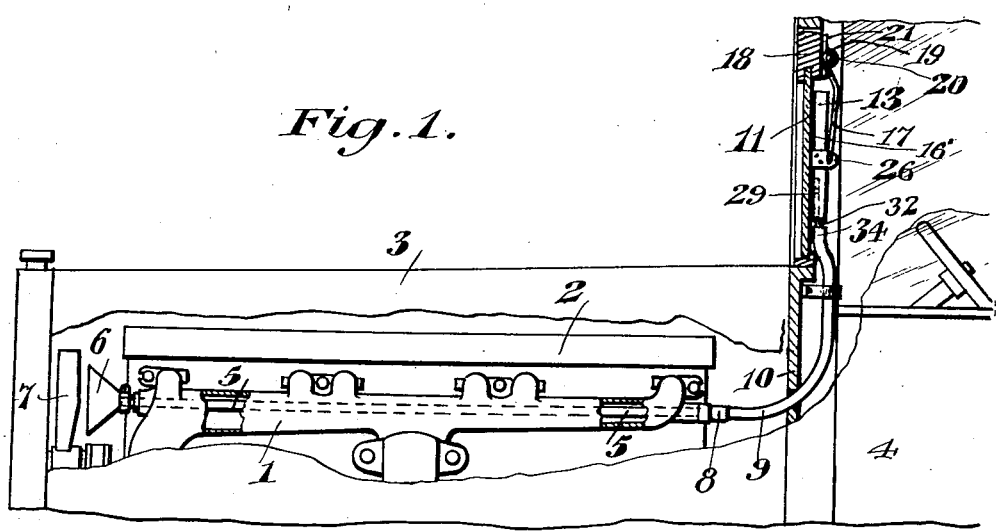
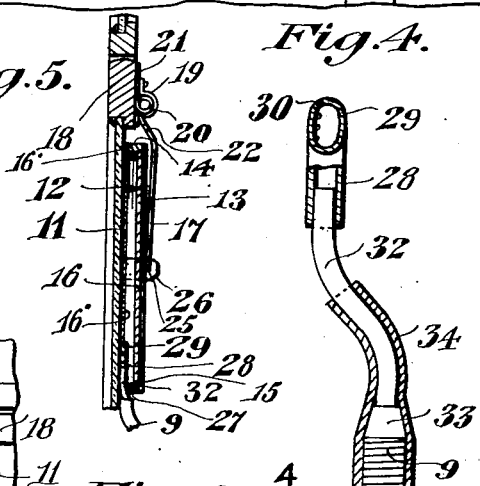
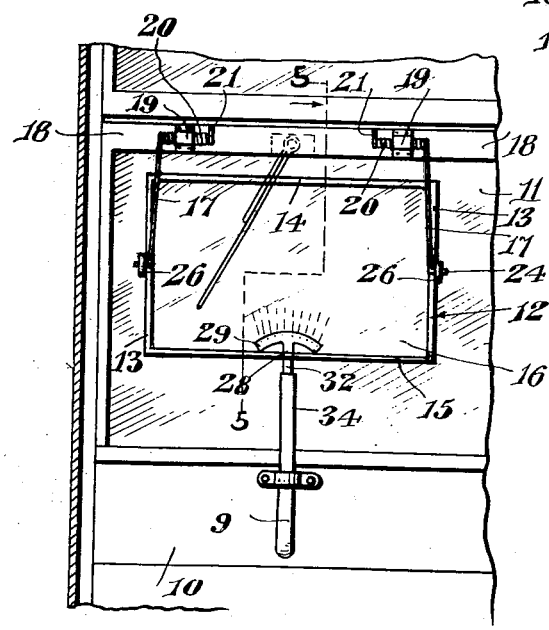
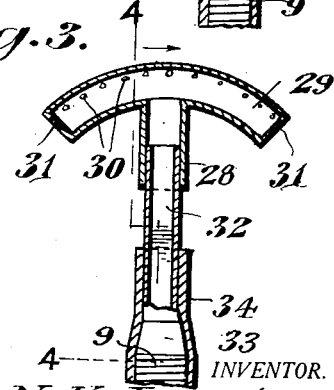
INVENTOR.
N. K. Isaak,
BY Geo. P. Kimmel
ATTORNEY.

Patented Dec. 24, 1929

1,741,058

UNITED STATES PATENT OFFICE

NATHANIEL K. ISAAK, OF PARKSTON, SOUTH DAKOTA

WINDSHIELD HEATER

Application filed June 4, 1928. Serial No. 282,614.

This invention relates to a windshield heater and has for its primary object to provide, in a manner as hereinafter set forth, a device whereby the windshield of a motor vehicle may be heated, thereby preventing ice and sleet from collecting thereon.

A further object of the invention is to provide a device for the purpose aforesaid, wherein air may be heated by the manifold of the vehicle to which the device is attached and directed against an enclosed surface portion of the windshield.

A further object of the invention is to provide a closing means for a surface portion of a windshield having detachable means for connecting the same with the manifold, whereby the closing means may be disconnected and the heat directed into the body of the vehicle for heating the latter.

A further object of the invention is to provide a device as aforesaid which is simple in construction, durable, entirely free from manifold odors, efficient, inexpensive to manufacture, and which may be readily attached to any type of windshield now in common use.

Other objects and advantages of the invention will be apparent during the course of the following description.

In the accompanying drawings in which like numerals are employed to designate like parts throughout the same, Figure 1 is a fragmentary view of a motor vehicle in sectional elevation, showing an embodiment of my invention connected therewith, Figure 2 is a fragmentary transverse section through the body of a motor vehicle, showing an embodiment of my invention in assembled relation with respect to the windshield, Figure 3 is an enlarged vertical section through the heat distributing element, Figure 4 is a section taken on line 4—4 of Figure 3, Figure 5 is a section taken on line 5—5 of Figure 2.

In the drawings wherein for the purpose of illustration is shown an embodiment of my invention, the numeral 1 designates a manifold, secured in the usual manner to an engine 2, located under the hood 3 of a motor vehicle 4. Extending longitudinally through the manifold 1, and projecting from either end thereof, is a pipe 5, which is connected with a funnel-shaped member 6 located directly behind the fan 7. The rearward end of the pipe 5 is connected by means of a coupling 8 with a flexible tube 9 which extends through a hole in the partition 10, which divides the body portion of the vehicle from the hood portion.

Secured to the inner face of the windshield 11 is a closure member 12, which is formed of a rectangular frame having side members 13, and a top and bottom 14 and 15 respectively. When the members 13, 14 and 15 are assembled to form the frame 12, the side faces of said members are disposed in opposed relation. The closure member 12 is provided with a transparent back 16, which is secured to the members 13, 14 and 15 adjacent the rearward longitudinal edges of said members.

The front of the member 12 is open and the forward longitudinal edges of the members 13, 14 and 15 have secured thereto a cushion 16' which seats against the rear face of the windshield 11 when the windshield 11 and closure member 12 are in assembled relation.

The closure member 12 is secured in position by means of a spring member indicated generally at 17, which is secured to the windshield frame 18, by means of a pair of keepers 19. Each of the spring members 17 consists of a coiled portion 20 which extends under the keeper 19 and is secured thereby against bodily movement. The inner end of the coil 20 terminates in a vertically extending end portion 21, which forcibly bears against the inner face of the frame 18 of the windshield 11. At the outer end of the coiled portion 20, the spring members 17 extend outwardly and downwardly as at 22 to a point adjacent the upper edge of the member 12, then extend downwardly and slightly inwardly as at 23, and terminate in a laterally offset end portion 24, which visibly extends through a perforation 25 formed transversely through an ear 26, which is secured to the outer face of the side member 13, and projects rearwardly beyond the plane of the transparent back 16.

The bottom member 15 of the frame is formed with a centrally disposed, vertical opening 27, through which extends the shank 28 of a combined heat supply and distributing element 29. The element 29 is of arcuate contour and extends longitudinally within the space between the windshield 11 and the back 16 of the member 12. The member 29 is formed in its forward face, adjacent the upper edge thereof, with a series of perforations 30. The forward face of the member 29 is slightly convexed, and the openings 30 are disposed at a slight angle with respect to the windshield 11. The member 29 is provided in the ends thereof with perforations 31 similar to the perforations 30.

The shank 28 projects below the lower face of the bottom member 15 of the closure member 12, and is connected with a curved rigid tube 32, the upper end of which extends within the lower end of the shank 28. The shank 28 and member 29 are hollow throughout. The lower end of the tube 32 extends within the upper end of the flexible tube 9, and a tight connection therebetween is provided by means of solder as shown at 33. The flexible tube 9 and rigid tube 32 may have tape wound thereon as shown at 34.

In operation the pipe 5 is heated by the hot gases within the manifold 1, which heats the air that is drawn through the pipe by means of the fan 7 forcing the same into the funnel member 6. The air passes on through the tubes 9 and 32 and into the member 29, from which it is projected in a plurality of streams through the perforations 30 directly onto the inner face of the windshield 11 and also outwardly through the perforations 31 toward the side extremities of the space between the windshield 11 and the closure member 12. If desired the tube 32 may be disconnected from the shank 28 of the member 29, and the air directed into the interior of the vehicle for heating the latter. When it is desired to discontinue the use of the device, as in warm weather, the coupling 8 may be removed and a suitable plug substituted therefor to close the outer end of the pipe 5. The closure 12 may be readily removed, simply by removing the keepers 19 from the frame 18 of the windshield 11. If desired the closure member 12 may be removed by merely disconnecting the ends 24 of the spring members 17 from the ear 26.

It is to be understood that the form of the invention herewith shown and described is to be taken as the preferred example of the same, and that various changes in the size, shape and arrangement of parts may be resorted to without departing from the spirit of the invention or the scope of the appended claim.

What I claim is:

In a windshield heater, a closure member adapted to be associated with a windshield to provide an air space, said member having a pair of opposed, apertured ears projecting from the rear face thereof, and a pair of resilient elements for detachably securing said member in position to provide said air space, each of said resilient elements comprising a central portion adapted to be secured to the frame of the windshield, an end portion for bearing against the frame, and another end portion terminating in a laterally offset projection extending through one of said apertured ears.

In testimony whereof, I affix my signature hereto.

NATHANIEL K. ISAAK.